May 30, 1939.  S. A. NEIDICH  2,160,277
PHOTOGRAPHIC LINE-JUSTIFYING APPARATUS
Filed Dec. 7, 1935  4 Sheets-Sheet 1

INVENTOR:
Samuel A Neidich
BY B.C. Stickney
ATTORNEY

May 30, 1939.  S. A. NEIDICH  2,160,277
PHOTOGRAPHIC LINE-JUSTIFYING APPARATUS
Filed Dec. 7, 1935  4 Sheets-Sheet 2

INVENTOR:
Samuel A Neidich
BY B.C. Stickney
ATTORNEY.

May 30, 1939.  S. A. NEIDICH  2,160,277
PHOTOGRAPHIC LINE-JUSTIFYING APPARATUS
Filed Dec. 7, 1935   4 Sheets-Sheet 3

INVENTOR:
Samuel A. Neidich
BY D. C. Stickney
ATTORNEY.

May 30, 1939.　　　　　S. A. NEIDICH　　　　2,160,277
PHOTOGRAPHIC LINE-JUSTIFYING APPARATUS
Filed Dec. 7, 1935　　　　4 Sheets-Sheet 4

Patented May 30, 1939

2,160,277

UNITED STATES PATENT OFFICE 2,160,277

PHOTOGRAPHIC LINE-JUSTIFYING APPARATUS

Samuel A. Neidich, Ventnor, N. J., assignor to Underwood Elliott Fisher Company, New York, N. Y., a corporation of Delaware Application December 7, 1935, Serial No. 53,309

5 Claims. (Cl. 95—4.5)

This invention relates to the use of the typewriting machine in the production of books, periodicals, circulars, and the like, and its object is to improve the quality of the work, reduce the cost, and overcome outstanding objections to the use of typewriting as a printing factor.

It is aimed to utilize the low cost of typewriting, by using the same directly for producing an original, without re-writing, and in an unexceptionable manner.

An objection to the use of typewritten copy has been its uneven right-hand margin, and such copy is not suitable for books and other publications.

In the typesetting art, the lines of types have individually been made even or "justified". It has been sought to minimize the fault of typewriting, that the machine fails to justify the lines, by rewriting the typewritten page in a way to make the lines come out even.

A leading feature of this invention is the employment of photographic apparatus for producing from a typewritten reproduction-sheet or master-sheet, a photographic plate, negative or other light-sensitive medium which is made in such a manner that the camera mechanism itself is utilized in making the photographed typewritten lines come out even.

In the art of photolithography, a typewritten original is preferable, because it can be made more promptly and at much less cost than types can be set up.

A typewriting machine properly constructed and equipped, is capable of producing clearly and artistically typed lines, rivalling the work produced by the printing press, and the photographic method herein set forth produces a most excellent film from such typewritten reproduction-sheet, and at the same time cures the eyesore of the typewritten sheet, of unevenness in the length of its lines.

Although the page, with its unjustified lines, is typed before the camera is brought into play, still the novel camera mechanism is made to produce an excellent negative or film from such typewritten page, and with its lines all justified, according to the invention.

This invention therefore relates to line-justifying means, and in particular to a photoelectrically controlled mechanism for automatically justifying the lines after the page has been typewritten but without the necessity of rewriting the same.

The typed reproduction-sheet is mounted in front of a camera, which for the purpose of this invention exposes its film only one band at a time, while the typed reproduction-sheet is exposed a line at a time; the rest of the sheet being shielded. Thus there may be as many exposures as there are lines typed on the reproduction-sheet. The exposures follow one another rapidly, so that a film is completed for an entire ordinary page within a minute or so, and the character of the film is most excellent.

Although the lines of a typewritten page are of uneven lengths, still the typed page has an even left-hand margin. The novel line-justification is accomplished by extending under-length lines photographically. Thus the even left-hand margin is maintained, and an even right-hand margin is produced.

In preparing the typewritten reproduction-sheet, it is only necessary for the typist to make all the lines of nearly equal length. If the longest typed line is say eight inches long, then the shorter typed lines may vary in length from 7.9 to 7.4 inches.

At the photographic exposure of each typed line, its length (if short) is increased as it is photographed upon the film. The camera has a novel automatic focussing mechanism, effective for each line individually, to increase its length to the requisite extent, so that the film, after being chemically treated in the usual way, will show lines of equal length throughout the page.

Thus at little expense a photographic film is produced ready for use in lithography, whereby copies can be multiplied as acceptably as by the use of the comparatively expensive ordinary printing press. The cost and delay of producing an original page, by expensive type-composition methods, for lithographic multi-copying, is avoided.

In preparing the original typewritten reproduction-sheet, it is only necessary for the typist to attend to keeping all lines within say six or seven characters of a standard length. The camera, photographing line by line, automatically enlarges the shorter lines to compensate for their lack of length, as noted. In so doing the camera increases the breadth and height of the characters of such lines. In minimizing such enlargement, experience has shown that the eye of the reader does not detect the difference in the size of the characters if the lines are kept within say seven characters of the same length.

As each line of typing is completed, the operator strikes a gap-measuring device in the form of a spot-key, whose type-bar prints a black control-spot at the end of the short line. The spot is placed the same number of letter-spaces away from the end of each line. The spots are out of range of the camera lens, so as not to appear on the negative.

The typewritten reproduction-sheet, with its right-hand marginal spots, is placed about a roller or work-holder, so that only the first line of typing is exposed through a transverse slit in a blind which hides the sheet.

In a camera, a negative or other light-sensitive medium is covered by an opaque plate which has a transverse slit.

Operation of the shutter of the camera photographs the line from the paper through the slots and onto the portion of the negative or other light-sensitive medium that is exposed through the plate slit.

The typewritten original is supported on a work-holder or roller which can be line-spaced in the same manner as the roller of a typewriter, exposing the lines to be justified one at a time through the slit in the blind.

Each exposed line is scanned automatically by a photo-sensitive unit or eye. The usefulness of this unit is dependent upon the degree of illumination of successive areas of the exposed typed line on the sheet.

There is at one point a difference in illumination reflected from the exposed typed line, this difference being caused by the black control-spot typed thereon, which spot is detected by the photo-sensitive unit, as the latter automatically scans the exposed line of writing near its right-hand end.

Automatic adjustment of the camera lens is effected by the scanning unit, when its photo-electric cell or eye "sees" the control-spot that is placed on the paper. The scanning unit is advanced leftwards towards the right-hand end of each line, by means of a two-part reciprocating shaft, operatively connected to a continuously-driven shaft, until it "sees" the spot.

The spot affects the electric cell itself, by causing it to close a circuit, which includes a solenoid detent, which arrests the part of the shaft that actuates the unit. The other part of the shaft continues to move and so closes another circuit, which includes a shutter solenoid for making the photographic exposure.

The scanning movement of the unit starts from a point beyond the end of the longest line of writing, which point would mark the beginning of an operating cycle, and there occurs simultaneously automatic adjustment of the lens of the fixed camera toward the roller that carries the reproduction-sheet. As the scanning movement of the unit continues, the lens draws nearer to the sheet. When the unit detects the control-spot, it is arrested, and the camera lens is also arrested.

The unit does not need to scan the first portion of the line. The lens and the scanning unit are connected to move proportionally the one to the other. During the scanning movement, the lens advances so that it will more and more magnify the length of the line. When the scanning unit detects the black spot, the lens occupies a position of adjustment for lengthening or magnifying that line to a degree that is determined by that black spot.

Continued movement of the cycling mechanism causes automatic operation of the camera shutter to photograph the typed line through the slit in the blind. Then line-spacing of the typed original and of the negative or other light-sensitive medium in the camera takes place automatically, thus completing the cycle.

In other words, after the exposure is made, the scanning unit is swung back to its "start" position, a cam on the continuously-driven shaft operates the line-space mechanism to advance the paper and also the film or other light-sensitive medium to complete the cycle..

The second line of typing on the paper can then be photographed through the slits in the blind and plate onto the newly-exposed cross-band or portion of the negative or other light-sensitive medium.

The lines so recorded onto the negative, however, have been photographically justified by the reason of the automatic movement of the camera-lens toward and away from the work-holder. The lens enlarges the short lines as much as necessary to make them the same length as the longest line.

The line-spacing and photographing are continued until the entire typewritten sheet has been photographed line for line onto the negative, which for convenience is wound on spools in the camera.

This cycle may be completed line by line at a speed of say three seconds per cycle, until all of the lines of the typed original have been photo-justified on the film or other light-sensitive medium. The adjustment of the lens is in a direction which will photographically preserve the even left-hand margin on the negative or other light-sensitive medium.

The reproduction-sheet is placed on the roller so that the even left-hand margin is properly aligned with a margin-indicator on the blind or other part of the work-holder, and the movement of the lens causes the short lines to be photographically expanded from left to right, to bring about an even right-hand margin on the negative page.

Another advantage derivable from the invention is that of line-space regulation of the matter on the negative. Both the work-holder and the camera are equipped with line-spacing means, which may be regulated independently one of the other. If the lines of the typewritten copy have been double-spaced, for instance, there may be effected a preparatory setting of the line-space mechanism of the camera to impart a single line-space movement to the negative, so that the matter would be single line-spaced on the negative. Any single, double or triple line-spacing of the matter on the original typewritten copy can be line-spaced as desired on the negative as the photographing operation proceeds.

The invention both as to its organization and method of operation, together with additional objects and advantages thereof, will be understood from the following description of a specific embodiment, when read in connection with the accompanying drawings, in which:

Figure 4ᵃ shows film being wound upon a large spool in the camera.

Referring to the drawings, 12 indicates a base having legs 13 and supporting a reproduction-sheet holder 14 and a camera 15.

In the reproduction-sheet holder 14 a roller 16 is mounted on shaft 17 journaled in frame 18, including ends 19 and 20, connected by an inclined paper-table 21 at the introductory side of the roller. The roller 16 may have knobs 22 on shaft 17. Line-space mechanism includes a ratchet-wheel 23 fixed to the roller axle, and engaged by detent 24. A pawl 25 is pivoted to slide 26, mounted in the frame-end 19 and in a support 27. A returning spring 28 is connected to the slide and frame. The slide 26 is actuated by line-space arm 29.

The normally released pawl 25 is held away from the ratchet-wheel during a portion of the stroke of the slide. The pawl rides on a ledge 30 carried by an adjusting lever 31, which may be set through the medium of an attached guide arm 32 and its detent spring 33, to permit the pawl to engage the ratchet-wheel earlier or later in the stroke of the slide, and thereby cause the ratchet-wheel to rotate the roller and advance the reproduction-sheet one or more line-spaces upon operation of the line-space arm 29. The pawl 25 is arrested by contact with the support 27, preventing overthrow.

The paper-apron 21 is provided with openings 34 through which the feed-rolls 35 can contact with the roller 16. The feed-rolls are releasable, as known in typewriter construction, to permit adjustment of the reproduction-sheet 36, which bears the typewritten matter to be photographed and justified.

The paper-apron 21 extends forwardly beneath the roller and up in front thereof, to form a blind, shield or screen 37, in which is provided a lateral slit 38.

This slit exposes one of the typed lines on the sheet 36. The slit 38 is preferably placed at the horizontal diameter of the roller, which is the point nearest the camera 15.

The blind provides a black non-reflecting surface, except in the white zone 38ᵃ, which white zone is as wide as the slit 38 and in alignment with the right end thereof. The upper edge of the blind 37 is provided with an indicator 39, with which the left margin 40 of each reproduction-sheet is aligned.

The line-spacing mechanism may be like that employed in standard Underwood typewriters, and the lines of typewriting on the sheet 36 may be successively exposed in proper relation through the slit 38 in the shield. This mechanism is automatically actuated by rock-shaft 41, through vertical counter-shaft 42, which carries said arm 29 and is journaled in the frame and base bearings 43 and 44 respectively. Shaft 42 is operatively connected to said rock-shaft 41 by the arm and linkage combination 45, said rock-shaft being supported in bearings 46 on the base 12 and extending from the sheet-holder 14 to the rear of the camera 15.

In the justifying operation, the photographic negative or film 47 is advanced in line-spacing movement from a supply spool 48 onto a winding spool 49, both spools being supported in housing 51 of the camera, on studs 52, mounted in the side walls 50 of said housing. At one side each stud is yieldably held projected by a spring bearing 53, such as commonly employed in cameras for acting as a drag on the spools, and for permitting ready replacement thereof, and also for urging the spools endwise toward one wall of the housing, so that even tracking of the film is assured. Replacement of the spools is facilitated by a removable back or cover 54 on the housing 51.

Figures 1, 11:
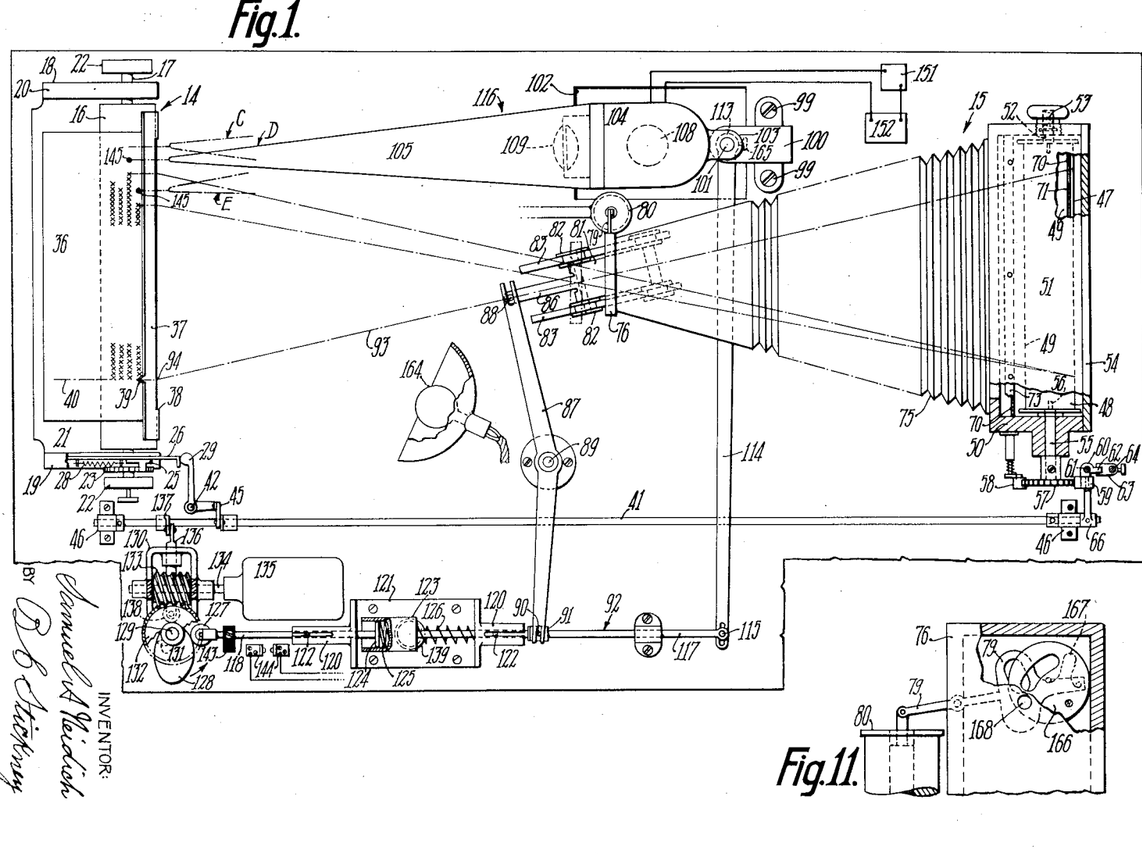
Figure 1 is a plan view of the mechanism used in carrying out the invention, the different operating positions of some of the parts being shown in outline.
Figure 11 is a view in elevation of the face of the camera showing the light-opening, the shutter and shutter-operating means.
Figure 2:
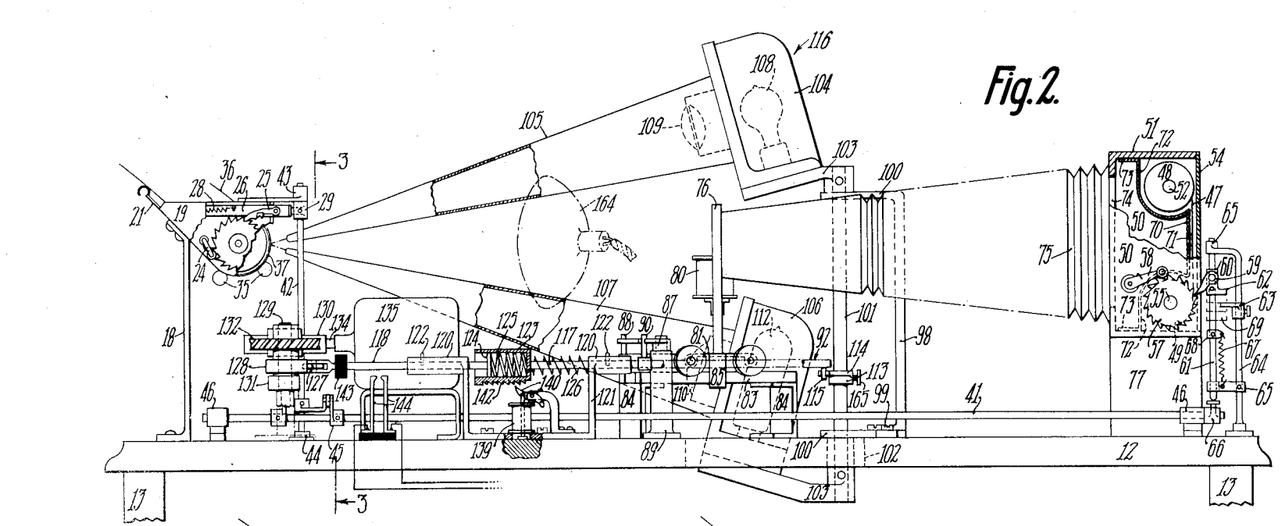
Figure 2 is a view in side elevation of the machine, illustrated in Figure 1, parts thereof being shown in section.

As shown in Figures 1 and 2, the stud at one end of the spool 49 constitutes a winding shaft 55, the key end 56 of which engages the usual slot in the winding spool 49, to revolve the latter at the operation of the ratchet-wheel 57 secured to said spool-shaft 55 exteriorly of the housing 51.

Ratchet 57 is engaged by detent 58, mounted on housing 51, the ratchet being given a line-spacing movement by the pawl 59, which is pivoted to a sleeve 60 secured to a vertically disposed pawl-bar 61. The sleeve 60 has a nose 62 thereon, which engages a stop 63, the latter being mounted for adjustment on a standard 64, through whose guide bearings 65 the bar 61 has reciprocatory movement.

The bar 61 is normally forced downward into contact with the free end of a lift-arm 66 that is secured to rock-shaft 41, by means of a tension spring 67 connecting the bar collar 68 with the lower guide 65.

As the rock-shaft is cycled, it causes vertical reciprocation of the bar 61, the down stroke of which is varied by the adjustment of stop 63, to determine whether the pawl 59 shall impart to the ratchet 57 a small or great line-spacing movement of the negative. The limits of drop of the pawl 59 for one, two and three line-spacing movements are indicated in outline as at 69. The throw of the lift arm 66 is sufficient to permit drop of the bar 61 as much as necessary to carry out the line-spacing of the light-sensitive medium.

The line-spacing of the previously-typed reproduction-sheet, as well as the line-spacing of the negative, can be varied, so that if the sheet is double line-spaced, for instance, and it is desired that the justified matter photographed on the film shall be single line-spaced, the independent adjustments of the line-spacing mechanisms will provide for double line-space movement of the reproduction-sheet 36 and simultaneous single line-space movement of the negative 47; both line-spacing mechanisms being, however, automatically operated by the same shaft 41.

In employing the term "negative", there is contemplated the use of sensitized paper, or film, or any suitable photographic medium.

In order to protect the unrolled area of the negative 47 between the spools 48, 49 from light exposure during the justifying operation, an opaque light-screen or partition 70 is positioned inside the spool-housing having a central portion disposed adjacent the front surface of the negative, and slitted as at 71 to permit exposure of that portion of the negative upon which the line being justified is photographed.

The light-screen 70 extends from side wall to side wall of the housing, and may be shaped to provide pockets 72 for the spools 48, 49, and may be secured at its upper and lower ends 73 to the top and bottom respectively of said housing.

The front wall of the housing 51 is provided with an opening 74, the usual extensible portion 75 of the camera being used to join the lens and shutter carrier 76 to said front wall, so that the carrier 76 may be moved relatively to said housing 51, which is fixed on the base 12, as at 77. The shutter may be of the well-known form, and also the lens which is indicated diagrammatically at 78 in Figure 4. The shutter is actuated by trigger 79, which extends from carrier 76 and is operated automatically at a predetermined time by a solenoid 80 mounted on the carrier 76.

Movement of the lens 78 nearer to the sheet-holder 14 will result in the photographic lengthening of a line of typing on the negative. For this purpose the carrier 76 is suitably mounted on a truck 81, the wheels 82 of which roll on parallel tracks 83, supported from base 12 by brackets 84. The opposite sides of the truck 81 are provided with depending guards 85, which extend beneath tracks 83 to prevent the truck from rising from the tracks.

The forward end of said truck 81 is provided with a tongue 86, to which one end of an operating lever 87 has pin-and-slot connection as at 88. The lever 87 is pivoted on base-stanchion 89, and at its other end has pin-and-slot connection 90 to collar 91 secured to a longitudinally movable cycling shaft 92. Reciprocation of the shaft 92 will, through lever 87, move the carrier 76 toward and away from the sheet-holder 14.

The face of the carrier 76 is parallel with the roller 16 at all times. The lens 78, as well as the slit 71 in screen 70, are in horizontal register or alignment with the slit 38 in shield 37, so that the lines of typewriting of various lengths, that successively appear through the slit 38 can be photographed successively to an even condition by the lens in its self-regulated movements, and through the slit 71 and on the negative 47.

The tracks 83 are so positioned that the line-justifying movement of the lens 78 will be along the path of a ray of light shown diagrammatically at 93 (Figures 1 and 4) that is reflected from the typed sheet 36, at the point 94 which is in register with the margin-indicator 39, and consequently with the left margin 40 of the typewritten matter on the typed sheet.

Figures 4, 4A:
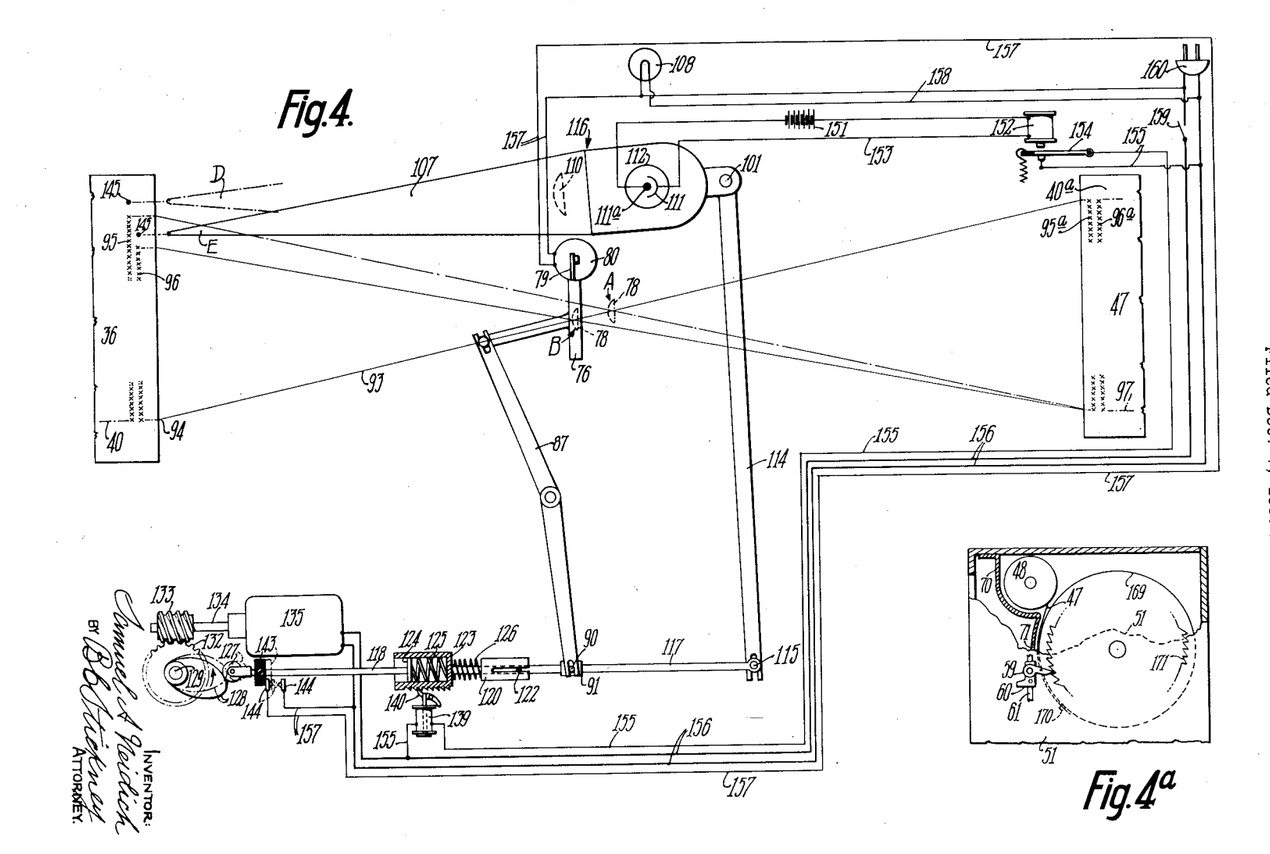
Figure 4 is a diagrammatic plan showing the photographic adjustment and sequence of justifying operations.
Figure 5:
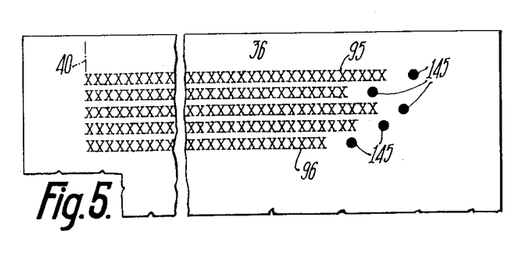
Figure 5 is a fragmentary view of a sheet of typewritten matter showing the spot printed at the end of each line, for use in automatically controlling the operation of the justifying mechanism.
Figure 6:
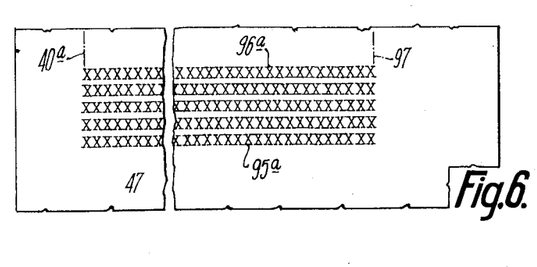
Figure 6 is a fragment of a photographic negative upon which has been photographed the matter on the sheet shown in Figure 5, so that the lines are justified to produce an even right-hand margin.

For the purpose, therefore, of illustrating the justifying action of the lens in connection with two lines of matter, of unequal length, reference is made particularly to Figure 4, which diagrammatically shows the longest line 95 and the shortest line 96 on the reproduction-sheet 36. Both lines 95, 96 begin at the margin 40; but the short line 96 terminates, for instance, six letters short of the long line 95 at the right-hand side of the sheet. In typing the sheet, the lines are preferably terminated within six or seven letters of each other, so that the eye of the observer will not appreciate any difference in the sizes of the letters in the justified result on the negative 47. The lens 78, at position "A", will photograph the long line 95 of the typed sheet onto the negative as at 95ª, preserving the left-hand margin 40 on the typed sheet as at 40ª on the negative. Movement of the lens 78 to position "B" will photograph the short line 96 of the typed sheet onto the negative as at 96ª, the movement of the lens from "A" to "B" photographically enlarging the line 96 as at 96ª until it is the same length on the negative as the long line 95ª. Thus an even right-hand margin 97 is produced on the negative by the photographic justifying operation carried out by the novel graduated movement of the lens 78 toward the typed sheet in each cycle of operation. Automatic adjustment of the photographic lens movement is accomplished by a novel photoelectric unit in the following manner:

A unit-support 98 is secured as at 99 to the base 12, and has passing through the extended arms 100 thereof, a vertically-disposed oscillatory unit-shaft 101. The lower arm 100 constitutes a bottom for the support 98, and extends over a clearance opening 102 that is provided in the base 12, to afford room for positioning and cycling of the unit. Secured to the upper and lower ends of shaft 101 are sleeved bracket-arms 103. Upon the upper arm is mounted what may be called a collimator, comprising a lamp-housing 104 and its associated light-cone 105 tapering to a light emitting opening at the end, which swings from side to side, thereby causing a pencil or spot of light to traverse the typed line near the right-hand side of the sheet, and to reach the black spot that is typed at the end of the line.

The lower arm carries a similar collimator, comprising a photoelectric-cell housing 106 and an associated cone 107, to exclude interfering light-rays, said cone tapering to an opening to admit only the reflected light spot.

These associated cones face the typed or copy side of the sheet 36 and reach as closely as possible to the slit 38 in blind 37, but are out of photographic range of the camera.

The light-cone 105 directs or collimates rays from lamp 108, which are concentrated by the lamp-lens 109, to the slit 38, to illuminate a small area of the exposed portion of the sheet 36. The light is reflected from the illuminated area of the reproduction-sheet through cone 107 and is collimated through the cell-lens 110 to impinge on the cathode 111 and anode 111ª of the photoelectric cell or "eye" 112.

The shaft 101 of the collimator-unit has adjustably secured thereto the collared end 113 of a unit-shaft-turning arm 114, the other end of which has pin-and-slot connection 115 to the end of reciprocatory cycling shaft 92. The latter, through arm 114 and shaft 101, will oscillate a photoelectric unit 116, which includes the lamp-and-cell organizations mounted on the arms 103, causing the "eye" to scan the right marginal portion of the top line on the typed sheet exposed in slit 38.

The cycling shaft 92 is made in two sections 117 and 118, slidably supported in axial alignment in sleeves 120 of a yoke-bearing 121 that is secured to base 12. The shaft-sections are splined at 122 to said sleeves.

The cycling shaft has two functions, one of which is to operate the scanning unit. As the scanning unit sees the spot on the reproduction-sheet, it acts to stop the operation of the scanning unit and shaft. The photographic exposure is made at the proper time in the cycling, after the spot has been detected, and the operation of the shutter of the camera is caused by the continued movement of the other section of the cycling shaft. A spring yieldably connects two sections of the shaft, so that the shutter-operating section may continue to move after the unit-operating section is stopped.

The scanning end 117 of the cycling shaft 92 within the yoke-bearing is provided with a spring cylinder 123, into the open end of which projects piston-end 124 of main cycling-shaft section 118, to engage and compress a spring 125. This spring has sufficient strength to permit drive endwise of both shaft-sections 117 and 118 simultaneously, against the action of a second compression spring 126, which is weaker than 125, and is carried on the scanning section 117 between the closed end of the cylinder and one end of the yoke-bearing, when the section 118, carrying cam-roller 127, is actuated by cam 128. Said cam is secured to a drive-shaft 129 journaled in a bearing-frame 130 on the base 12.

The drive-shaft 129 has secured thereto a worm-wheel 132, the latter being driven by a worm 133 on shaft 134 operated by motor 135.

Figure 3:
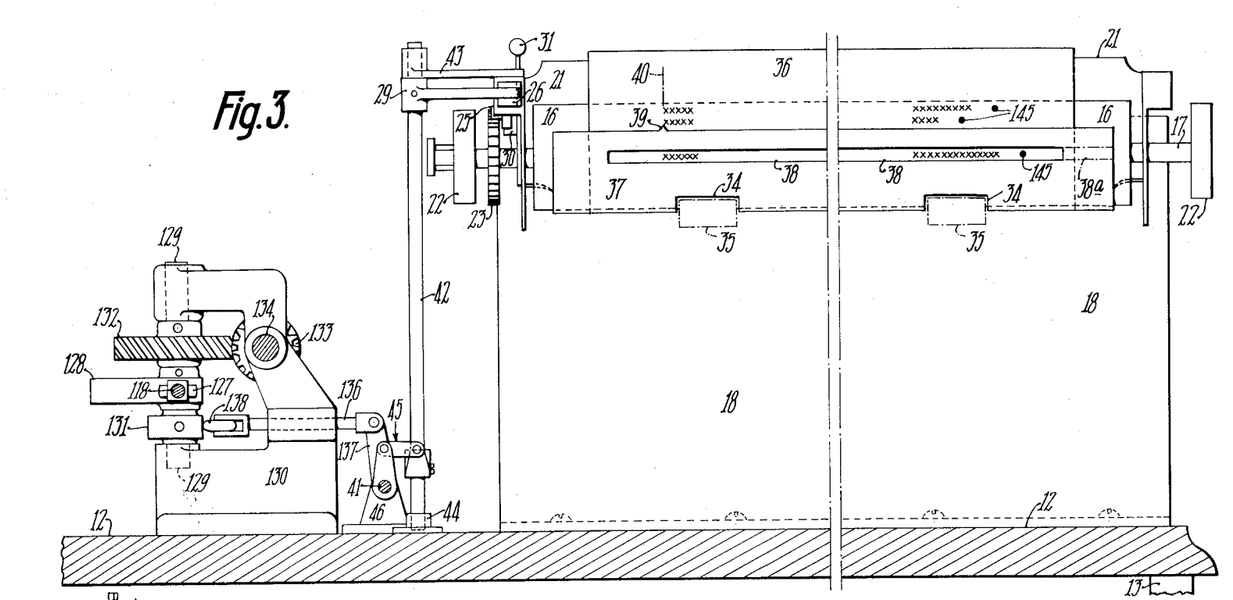
Figure 3 is a view in sectional elevation taken substantially on the line 3—3 of Figure 2 showing the shield used in exposing a line to be photographed, but covering the lines of matter adjacent thereto.
Figures 7, 8, 9, 10:
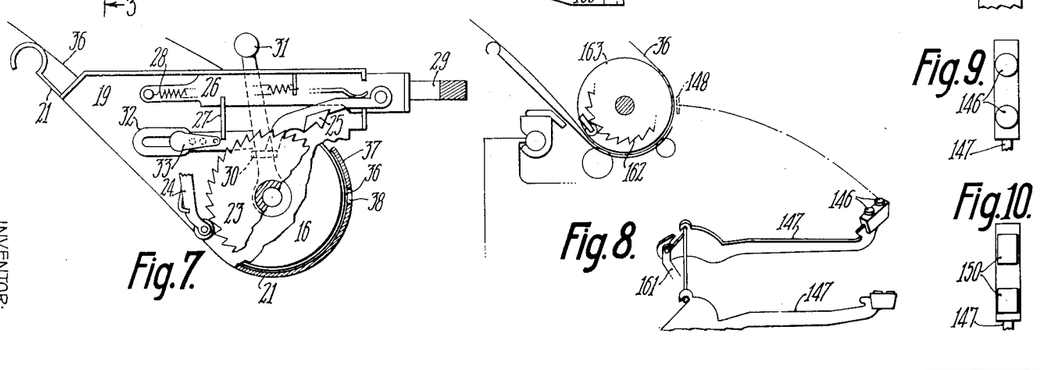
Figure 7 is a view in side elevation of line-spacing mechanism for the paper-carrying roller, the blind or shield being also partly shown in section.
Figure 8 is a view in side elevation of a part of a typewriter in which is incorporated a type-bar, in perspective, having thereon a control-spot type.
Figure 9 is an enlarged view of the striking face of the spot type.
Figure 10 is a view similar to Figure 9 showing a modified spot of rectangular shape.

A cam 131 on drive-shaft 129 rocks the line-spacing shaft 41 through a cam-bar 136, which is slidably mounted in the bearing-frame; the bar being connected at one end to the shaft 41 by an arm 137, and carrying a roller 138 at the opposite end for engagement by cam 131. The roller 138 is kept in contact with cam 131 by the spring 28 of the roller line-spacing mechanism, acting through the connecting parts 26, 29, 42, 45 and 41 (Figures 3 and 7).

The revolution of the drive-shaft 129 is continuous, but the movement of the shaft-section 117 is arrested at a predetermined time by the action of a solenoid 139 mounted on the yoke-bearing 121. The solenoid actuates a dog 140, pivoted in a support 141, to engage the teeth of a rack 142 on the under side of the spring cylinder 123. The shaft-section 118 can continue its movement after the dog engages the rack, the piston simply compressing the spring 125 while the shaft-section 117 remains stationary. Thus continued movement of shaft-section 118 causes a contact collar 143 of dielectric material secured to said shaft, to close the spring contacts 144 to complete an electric circuit, later referred to.

The medium employed in controlling the operation of the photoelectric or scanning unit 116, is a black terminal spot 145, which is printed on the typed sheet at the same interval from the end of each line of typewriting. The distance separating the spot from the last letter of the typed line is so great that the spot will not be photographed upon the negative. The spot 145 is printed by either of the upper and lower case spot types 146, which may be of maximum type size, carried on a bar 147. The spot 146 may be circular as shown in Figure 9, or rectangular as at 150, in Figure 10. The type-bar 147, of usual construction, Figure 8, is operated by the train 161 to print the spot on the reproduction-sheet 36 through the ribbon 148.

The line-space ratchet 162 gives the same line-space movement to the platen 163 as the ratchet-wheel 23 gives to the roller 16, so that the lines of typing to be justified register with the slit 38 in shield 37. The typist in preparing the sheet 36 makes all the short lines of typing terminate within six or seven letters of the longest line, and at the end of each the special key is struck to produce the spot 145 as shown.

The cycle of operation may start after a new line of writing to be photographed has been placed in register with the slit 38 in shield 37, by operation of the roller line-spacing mechanism as described, and when the scanning unit 116 is in the starting position indicated as at C in Figure 1. The cam 128, operating continuously, moves the shaft 92 endwise, against the tension of spring 126, to move the lever 87 and turning arm 114. The lever 87 causes the camera-lens 78 to creep toward the reproduction-sheet, while the arm 114 imparts to the unit 116 a scanning movement from right to left from the position at C. During the scanning movement, the photoelectric cell 112, which is included with battery 151 and sensitive relay magnet 152 in the relay circuit 153 (Figure 4), receives light from lamp 108, reflected from the white zone 38a on the shield, or the white reproduction-sheet 36.

As long as the photocell receives this full light reflection, the resistance in the relay circuit 153 will be sufficiently low so that the magnet 152 will hold the armature 154 in open-circuit position. When the unit has reached the full-line position D in Figure 1, the black control spot 145 is "seen" by the photocell, and the decrease in reflected light, due to the dark spot, will set up a resistance in the circuit 153, and the sensitive relay magnet 152 will release the armature 154, causing it to close the circuit 155, which is connected to the power or motor circuit 156 and includes the solenoid 139.

The energization of the solenoid 139 causes the dog 140 to engage the rack 142 and arrest section 117 of shaft 92. The spring 125 yields to permit continued movement of section 118 of shaft 92, so that the collar 143 thereon may close the contacts 144, Figure 4, to complete the circuit 157. Said circuit includes the solenoid 80, operating the shutter of the camera to photograph the line onto the negative.

As the cam 128 continues to revolve, the shaft 92 moves from right to left, thereby again positioning the unit at C, and also positioning the front of the camera accordingly.

As soon as this return movement is completed, the cam 131 and associated parts actuate the shaft 41, to line-space both the reproduction-sheet and the negative.

As the unit swings back, it clears the control spot, and the normal light reflection restores the armature 154 to open-circuit position, to permit the dog 140 to drop out of contact with rack 142.

The dog will yield to permit return movement of the shaft 92 before the circuit 155 has been broken. The current supply for lamp 108 is taken from the power-circuit 156 through circuit 158. The photographing operation is facilitated by the light 164 which illuminates the line to be justified, but the concentrated spot of light from lamp 108 may be more intense.

The cycle of operation is repeated for the next line, which is shorter, and in this case the scanning movement of the unit is arrested at position E, Figure 4. The increased movement of the unit to the control spot of this shorter line has caused creeping of the camera-lens nearer to the reproduction-sheet, so that the line is properly enlarged. Photographic justification of all the lines may thus be carried out without interruption, and without attention of the operator.

In order that no accidental operation of the camera-shutter can take place during changing of the reproduction-sheets, the roller 16 may be made white, to sustain the full light reflection. The power-circuit may include a switch 159 and a power-plug 160, the latter for connecting the power-circuit to an outside source.

If, under certain conditions, it should be desirable to change the starting position C of the scanning unit 116, this can be done by loosening the set-screw 165 on the collared end 113 of arm 114 and then adjusting the unit-shaft 101, as desired.

The "scanning movement" of the unit 116 is its movement from right to left. Its return movement to starting position C is accelerated by the shape of the cam 128. The movement of the lens is proportionate to the movement of the unit.

The camera-shutter (Figure 11) includes the shutter-trigger 79 for operating a shutter-disk 166 through a spring 167 to make the photographic exposure when the solenoid 80 is energized. The trigger 79 and disk 166 have light-openings which coincide with the light-opening 168 of the camera, to make exposure when the trigger operates in one direction only. While I have referred to "solenoid", any suitable magnet-device may be employed to actuate the trigger 79 or dog 140.

In a scanning movement, the photocell, while it receives the full reflected light which bridges its anode and cathode, maintains a relay circuit so that the relay keeps the solenoid circuit open. The solenoid circuit includes a stop means for simultaneously halting the scanning movement of the photo-cell and movement of the camera-lens. When the spot is "seen" by the photocell, the decrease of reflected light will not form a sufficient light bridge between the anode and cathode, and the relay circuit will weaken enough to permit the relay to close the solenoid circuit. The closed solenoid circuit will operate the stop means so that movement of the scanning unit and camera-lens will be arrested.

At the beginning of an operating cycle, the scanning unit is at the right, and it is sighting a point that is at the right of the end of the longest line that appears on the typed sheet. The movement always begins beyond the right end of the longest line, and the unit swings backward, or from right to left, towards the beginning of the typed line, until it detects the control spot. The unit is adjustable so that, if the typed matter on the page is either wide or narrow, the starting point of this backward scanning movement can be regulated.

A paragraph often terminates in a short line, and there is no occasion for justifying it, but the operator must nevertheless type in one of the black spots, preferably at the extreme right-hand end of such end-of-paragraph line, so that the cycle of photography operations may occur for that line.

To avoid gradual slight increase in the spacing of the lines as the diameter of the winding roll is increased by the winding of the film thereon, there may be employed a large winding spool 169 as at Figure 4ᵃ in the camera. The leading end of the film 47 is caught upon a pin 170 projecting from spool 169. The circumference of said spool 169 is so great that a page of film will not reach entirely around the spool, and hence there will be no additional coils of the film wound upon the spool, and hence no increase in the diameter, and the lines will therefore all have equal spacing. The spool may have a large-diameter ratchet-wheel 171 operated by pawl 59, as already explained.

Variations may be resorted to within the scope of the invention, and portions of the improvements may be used without others.

Having thus described my invention, I claim:

1. In an apparatus for photographing unequal-length lines of a copy sheet, line by line, in justified relation on a light sensitive medium; an adjuster movable, for each line, to justify the photographic line images on said medium, a collimator and a light source therein for projecting an incident spot of light on the copy side of said sheet, said collimator having a light spotting opening facing the copy side of said sheet, a second collimator and a light sensitive element therein, said second collimator having an opening facing the copy side of said sheet to receive the reflection of said light spot for reaction upon said light sensitive element, said collimators being connected and mounted to move jointly as a unit to move said light spot relatively to a copy line to find a line end sensing differential reaction upon said light sensitive element, means connecting the collimator unit to said adjuster so that the latter is moved in line justifying correspondence with the line end finding movements of said collimator unit, means for moving the collimator unit and adjuster, and means responsive to said differential reaction upon the light sensitive element to stay the movement of said adjuster.

2. In an apparatus for photographing unequal-length lines of a copy sheet, line by line, in justified relation on a light sensitive medium; an adjuster movable, for each line, to justify the photographic line images on said medium, a collimator and a light source therein for projecting an incident spot of light on the copy side of said sheet, said collimator having a light spotting opening facing the copy side of said sheet, a second collimator and a light sensitive element therein, said second collimator having an opening facing the copy side of said sheet to receive the reflection of said light spot for reaction upon said light sensitive element, said collimators being connected and mounted to move jointly as a unit to move said light spot relatively to a copy line to find a line end sensing differential reaction upon said light sensitive element, moving means, means connecting the collimator unit to said adjuster so that the latter is moved by said moving means in line justifying correspondence with the line end finding movements of said collimator unit, and means responsive to said differential reaction upon said light sensitive element to stay the movement of said adjuster, said collimator unit and adjuster being movable within a predetermined limited range, said connecting means being adjustable to shift the collimator unit relatively to said adjuster to place said unit in effective relation to the line end range of a copy-sheet.

3. In an apparatus for photographing unequal-length lines of a copy sheet, line by line, in justified relation on a light sensitive medium; an adjuster movable for each line to justify the photographic line images on said medium, a lighting means facing the copy side of said sheet so that the light will be reflected from said sheet, a collimator and a light sensitive element therein, said collimator facing the copy side of said sheet and having an opening adjacent to said copy side to receive only a spot of the light reflected from said sheet for reaction upon said light sensitive element, means mounting said collimator for movement relatively to a copy line to find a line end sensing differential reaction, by means of said light, upon said light sensitive element, moving means, means connecting the collimator to said adjuster so that the latter is moved by said moving means in line justifying correspondence with the line end finding movements of said collimator, and means responsive to said differential reaction upon said light sensitive element to stay automatically the movement of said collimator and adjuster.

4. In an apparatus for photographing unequal-length lines of a copy sheet, line by line, in justified relation on a light sensitive medium; an adjuster movable for each line to justify the photographic line images on said medium, a lighting means facing the copy side of said sheet so that the light will be reflected from said sheet, a collimator and a light sensitive element therein, said collimator facing the copy side of said sheet and having an opening adjacent to said side to receive only a spot of the light reflected from said sheet for reaction upon said light sensitive element, means mounting said collimator for movement relatively to a copy line to find a line end sensing differential reaction, by means of said light, upon said light sensitive element, moving means connecting the collimator to said adjuster so that the latter is moved by said moving means in line justifying correspondence with the line end finding movements of said collimator, and means responsive to said differential reaction upon said light sensitive element to stay automatically the movement of said adjuster.

5. In an apparatus for photographing unequal-length lines of a copy sheet, line by line, in justified relation on a light sensitive medium; an adjuster movable, for each line, to justify the photographic line images on said medium, a hollow collimator cone having a light source therein and a light-spot emitting opening at its apex, a second hollow collimator cone having a light sensitive element therein and a light-spot receiving opening at its apex, said collimator cones being connected and mounted to move jointly as a unit with said light-spot emitting and receiving cones, respectively, at incident and reflecting angles to the copy side of said sheet and with the cone openings adjacent said copy side, for moving said openings relatively to a copy line to sense the end thereof, moving means, means connecting the collimator unit to said adjuster so that the latter is moved by said moving means in line justifying correspondence with the line end finding movements of said unit, and means responsive to line end sensing reaction upon said light sensitive element to stay the movement of said adjuster.

SAMUEL A. NEIDICH.